United States Patent
McLaine

(10) Patent No.: US 12,017,933 B2
(45) Date of Patent: Jun. 25, 2024

(54) WATER TREATMENT SYSTEM AND METHOD

(71) Applicant: Paul Quentin McLaine, Easton, PA (US)

(72) Inventor: Paul Quentin McLaine, Easton, PA (US)

(*) Notice: Subject to any disclaimer, the term of this patent is extended or adjusted under 35 U.S.C. 154(b) by 577 days.

(21) Appl. No.: 16/902,984

(22) Filed: Jun. 16, 2020

(65) Prior Publication Data

US 2020/0392023 A1  Dec. 17, 2020

Related U.S. Application Data

(60) Provisional application No. 62/862,234, filed on Jun. 17, 2019.

(51) Int. Cl.
  *C02F 1/48* (2023.01)
  *A01C 23/04* (2006.01)
  *C02F 1/46* (2023.01)

(52) U.S. Cl.
  CPC .............. *C02F 1/48* (2013.01); *A01C 23/042* (2013.01); *C02F 1/4608* (2013.01); *C02F 2201/48* (2013.01); *C02F 2301/04* (2013.01); *C02F 2303/26* (2013.01)

(58) Field of Classification Search
  CPC ........ A01C 23/042; C02F 1/4608; C02F 1/48; C02F 1/484; C02F 2201/4613; C02F 2201/46135; C02F 2201/48; C02F 2301/04; C02F 2301/08; C02F 2303/26
  See application file for complete search history.

(56) References Cited

U.S. PATENT DOCUMENTS

| | | | |
|---|---|---|---|
| 8,066,886 B2* | 11/2011 | Holland | B03C 1/0335 204/557 |
| 8,999,154 B2 | 4/2015 | McGuire | |
| 9,850,156 B2 | 12/2017 | McLaine | |
| 2007/0205158 A1* | 9/2007 | Shanahan | C02F 1/481 204/557 |
| 2008/0230459 A1 | 9/2008 | Donahue et al. | |
| 2010/0102004 A1* | 4/2010 | Holland | B03C 1/0335 210/138 |
| 2014/0262826 A1 | 9/2014 | Rao et al. | |
| 2017/0107138 A1* | 4/2017 | McLaine | C02F 1/4602 |

FOREIGN PATENT DOCUMENTS

| | | |
|---|---|---|
| CN | 204443077 U2 | 7/2015 |
| CN | 107006196 A | 8/2017 |

OTHER PUBLICATIONS

"Magnetic water treatment and pseudoscience" retrieved from http://www.chem1.com/CQ/magscams.html, 21 pp.
Martin Chaplin, "Magnetic and Electric Effects on Water" retrieved from http://www1.lsbu.ac.uk/water/magnetic_electric_effects.html, Dec. 16, 2019, 6 pp.

* cited by examiner

*Primary Examiner* — Jonathan Miller
(74) *Attorney, Agent, or Firm* — Nathaniel C. Wilks; Eckert Seamans Cherin & Mellott, LLC

(57) ABSTRACT

A water treatment system includes a magnetic electrode stage structured to receive water and to subject the water to a plurality of magnetic fields alternating in polarity, a static mixer stage coupled to an output of the magnetic electrode stage and structured to direct the water through an alloy mesh, a high voltage electrode stage coupled to an output of the static mixer stage and structured to subject the water to an electrostatic field.

6 Claims, 4 Drawing Sheets

WATER TREATMENT SYSTEM AND METHOD

CROSS-REFERENCE TO RELATED APPLICATIONS

This patent application claims the priority benefit under 35 U.S.C. § 119(e) of U.S. Provisional Application No. 62/862,234 filed on Jun. 17, 2019, and entitled, "WATER TREATMENT SYSTEM AND METHOD," the contents of which are hereby incorporated herein by reference.

BACKGROUND

Field

The disclosed concept relates generally to water treatment systems, and more particularly, to water treatment systems for irrigation.

Background Information

Many agricultural operations use irrigation systems to provide water to plants. The irrigation systems include equipment, such as pumps, pipes, and other equipment to disperse irrigation water to the various plants serviced by the irrigation system.

Plant growth and health can be enhanced with the usage of fertilizers or other minerals or nutrients. Minerals and nutrients can be introduced to the irrigation water and dispersed to the plants using the irrigation system. However, while using the irrigation system to disperse the minerals and nutrients with the irrigation water provides the minerals and nutrients to the plants, it does not optimally enhance plant growth and health.

There is room for improvement in irrigation systems and water treatment systems for irrigation.

SUMMARY

These needs and others are met by embodiments of the disclosed concept, which are directed to a water treatment system that reduces the size of mineral and nutrient particles in irrigation water and reduces the surface tension of the irrigation water. These needs and others are also met by embodiments of the disclosed concept directed to water treatment methods.

In accordance with aspects of the disclosed concept, a water treatment system comprises: a magnetic electrode stage structured to receive water and to subject the water to a plurality of magnetic fields alternating in polarity; a static mixer stage coupled to an output of the magnetic electrode stage and structured to direct the water through an alloy mesh; and a high voltage electrode stage coupled to an output of the static mixer stage and structured to subject the water to an electrostatic field.

In accordance with other aspects of the disclosed concept, a method of treating water comprises: receiving water; causing the water to be subjected to a plurality of magnetic fields alternating in polarity; directing the water through an ally mesh; and causing the water to be subjected to an electrostatic field.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
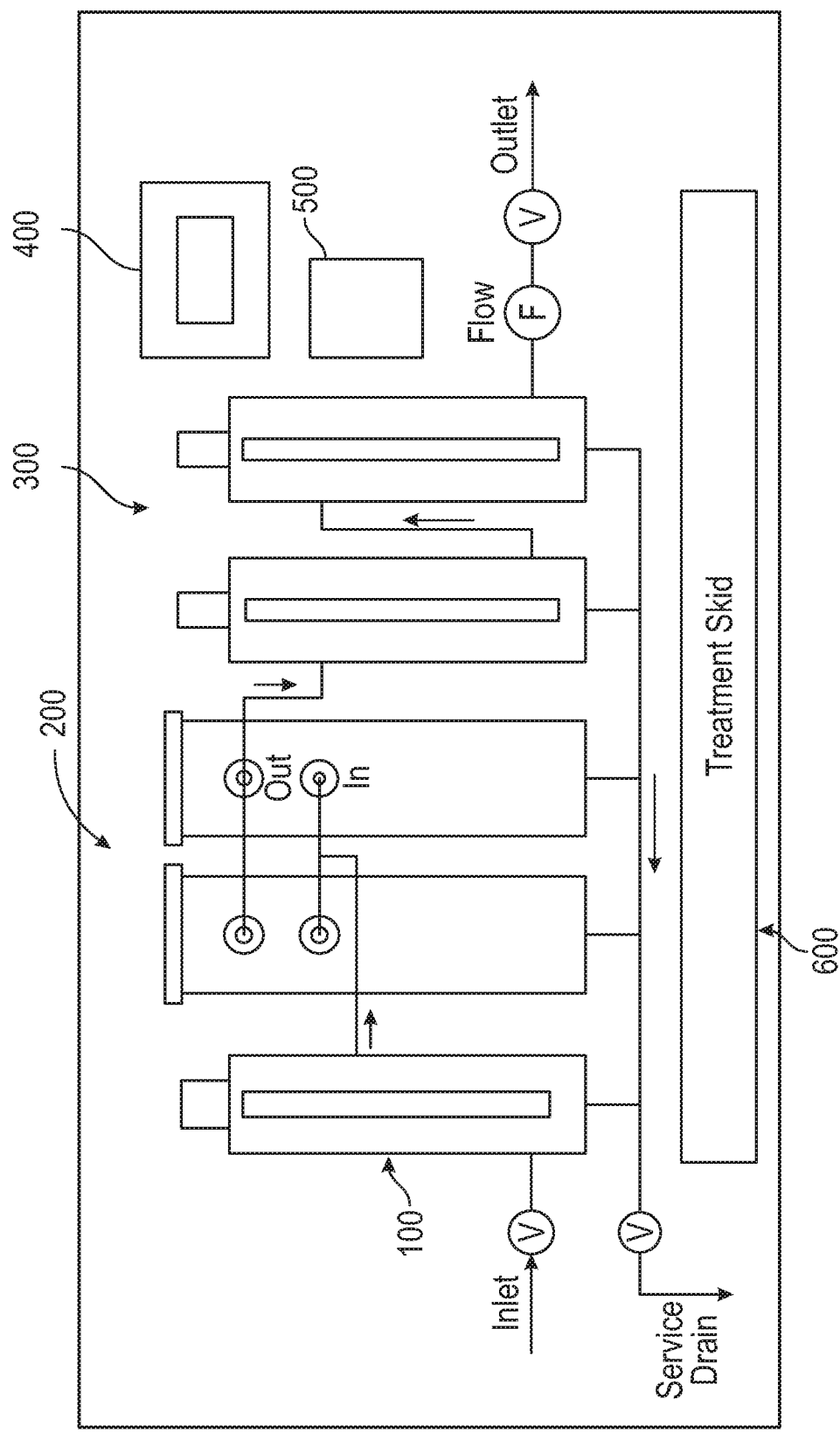
FIG. 1 is a schematic diagram of a water treatment system in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the term "processor" shall mean a programmable analog and/or digital device that can store, retrieve and process data; a controller; a control circuit; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "number" shall mean one or an integer greater than one (i.e., a plurality).

It is beneficial to reduce the size of minerals and nutrients provided to plants. For example, calcium is beneficial to a plant's tensile strength and health. Large clumps of calcium are difficult for plants to absorb. Smaller pieces of calcium are easier for plants to absorb. The same issues arise with other nutrients or minerals. The more a nutrient or mineral can be broken down before it is provided to a plant, the easier it will be for the plant to absorb. Reducing the size of nutrients and minerals provided to plants enhances the plants ability to absorb the nutrients and minerals, and thus, enhances the plant's growth and health.

FIG. 1 is a schematic diagram of a treatment system 1 that pre-treats irrigation water that can subsequently be provided to plants by an irrigation system. The system 1 allows the integration of nutrients and minerals into the irrigation water, reduces the size of particles of the nutrients and minerals, and reduces the surface tension of the irrigation water.

The system 1 includes three stages, a magnetic electrode stage 100, a static mixer stage 200, and a high voltage electrode stage 300. The magnetic electrode stage 100, the static mixer stage 200, and the high voltage electrode stage 300 are arranged sequentially. While an example of the order of the magnetic electrode stage 100, the static mixer stage 200, and the high voltage electrode stage 300 is shown in FIG. 1, it will be appreciated by those having ordinary skill in the art that the order of the stages may be modified without departing from the scope of the disclosed concept.

Figure 2C:
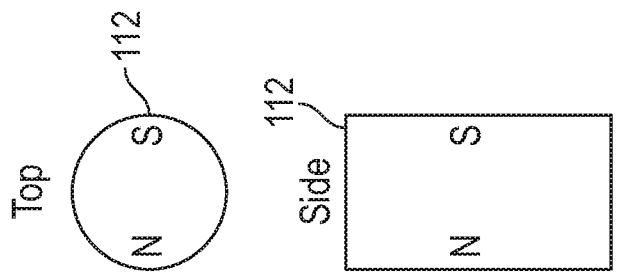
FIG. 2C is a view of a magnet in accordance with an example embodiment of the disclosed concept.
Figure 2B:
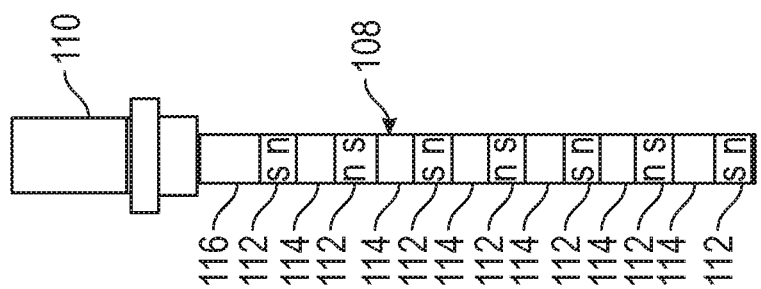
FIG. 2B is a schematic diagram of a magnetic electrode assembly in accordance with an example embodiment of the disclosed concept.
Figure 2A:
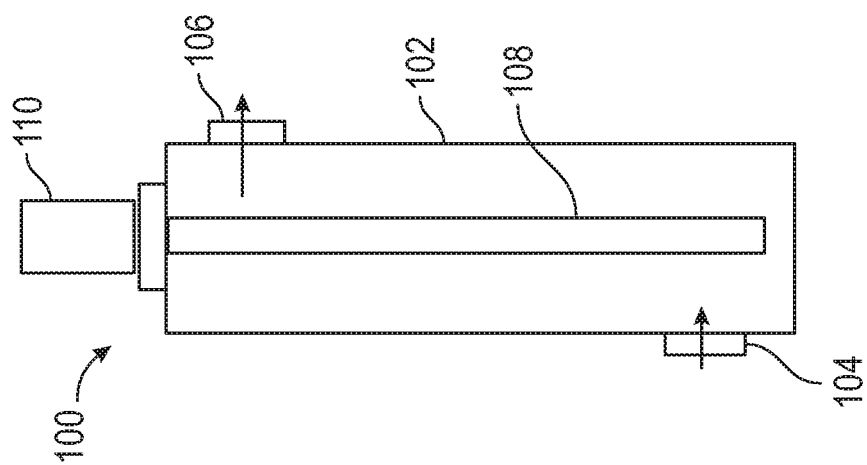
FIG. 2A is a schematic diagram of a magnetic electrode stage in accordance with an example embodiment of the disclosed concept.

The irrigation water is introduced at the magnetic electrode stage 100. FIG. 2A is a schematic diagram of the magnetic electrode stage 100, FIG. 2B is a schematic diagram of a magnetic electrode assembly 108, and FIG. 2C is a top and side view of a magnet 112. The magnetic electrode stage 100 includes an enclosure vessel 102. In some example embodiments, the enclosure vessel 102 may be a polyvinyl chloride (PVC) pipe including an inlet 104 and an outlet 106. However, it will be appreciated that other materials may be employed instead of PVC. In some example embodiments, the enclosure vessel 102 has a diameter of about 4 inches and a height of about 30 inches. However, it will be appreciated that the dimensions of the enclosure vessel 102 may be modified without departing from the scope of the disclosed concept. A head unit 110 may be attached at a top end of the enclosure vessel 102. In some example embodiments, the head unit 110 has a height of about 5 inches, but its dimensions may be modified without departing from the scope of the disclosed concept.

A magnetic electrode assembly 108 is disposed within the enclosure vessel 102. The magnetic electrode assembly 108 includes a plurality of spacers 114 and a plurality of magnets 112. The spacers 114 and magnets 112 are alternately stacked vertically. In some example embodiments of the disclosed concept, the magnets 112 are rare-earth magnets such as neodymium (Neo) magnets. However, it will be appreciated that other types of magnets may be employed without departing from the scope of the disclosed concept. The magnets 112 are arranged such that the polarity of each magnet 112 is opposite of the polarity of its adjacent magnets 112. For example, if one magnet 112 has its north polarity facing right and its south polarity facing left, the magnets 112 adjacent to it will have their north polarities facing left and their south polarities facing left. The magnetic electrode assembly 108 may also include a top spacer 116 disposed between adjacent to the head unit 110.

The diameter of the magnetic electrode assembly 108 is less than the diameter of the enclosure vessel 102 such that irrigation water can flow through the enclosure vessel 102 around the magnetic electrode assembly 108. The alternating polarities of the magnets 112 causes the irrigation water flowing from the inlet 104 to the outlet 106 of the enclosure vessel 102 to be subjected to an on/off square wave magnetic field with switching polarities as it flows through the enclosure vessel 102. For example, irrigation water that passes by north polarity side of one of the magnets 112 will then pass by a spacer 114 and then the south polarity side of the adjacent magnet 112 and so on until the irrigation water reaches the outlet 106. The result is that the irrigation water is subjected a magnetic field having a north polarity, then little or no magnetic field as it passes the spacer (i.e., off), and then a magnetic field having a south polarity, resulting in the irrigation water being subjected to the on/off square wave magnetic field with switching polarities. The alternating positive and negative charges applied to the irrigation water is effective to pull clumps of material, such as minerals or nutrient, in the irrigation water apart.

In some example embodiments of the disclosed concept, the magnets 112 have a cylindrical shape with a diameter of about 1.25 inches and a height of about 2 inches. The spacers 114, in some example embodiments, may be composed of PVC and have similar dimensions to the magnets 112. The magnets 112 and spacers 114 may be stacked in a secondary enclosure, such as a PVC or PVDF pipe having a sufficient inner diameter to receive the magnets and the spacers 114.

Figure 3C:
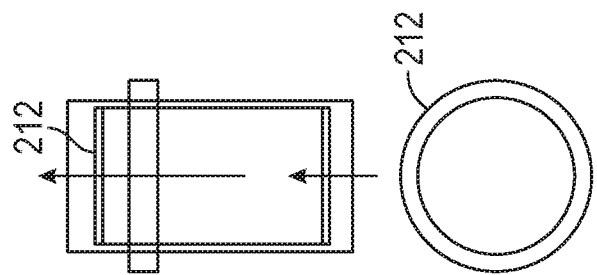
FIG. 3C is a view of a static mixer in accordance with an example embodiment of the disclosed concept.
Figure 3B:
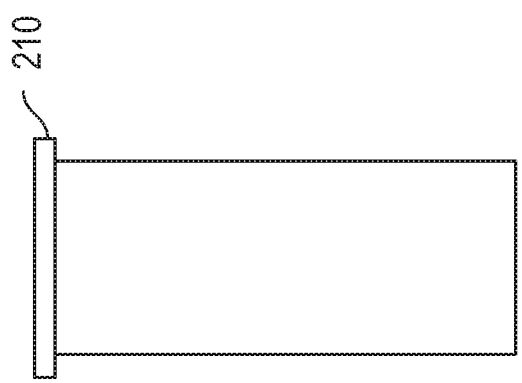
FIG. 3B is a schematic diagram of an inner wall in accordance with an example embodiment of the disclosed concept.
Figure 3A:
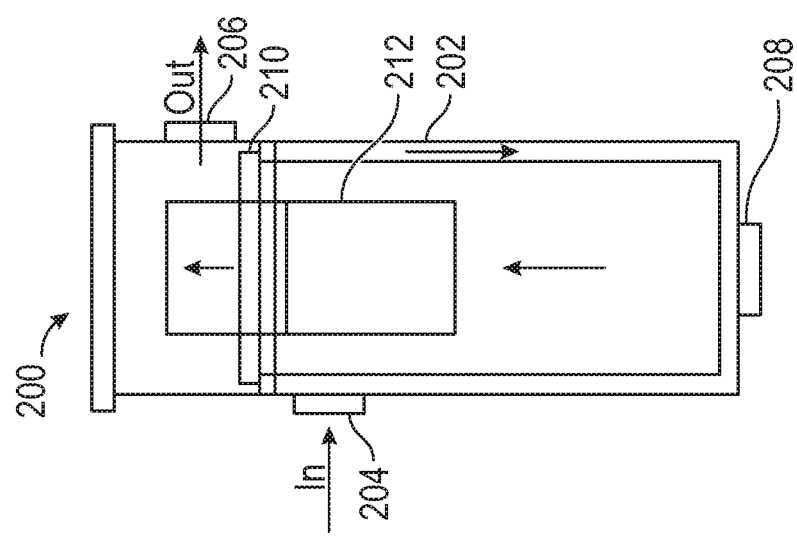
FIG. 3A is a schematic diagram of a static mixer stage in accordance with an example embodiment of the disclosed concept.

Once the irrigation water passes through the outlet 106 of the enclosure vessel 106, it proceeds to the static mixer stage 200. FIG. 3A is a schematic diagram of the static mixer stage 200, FIG. 3B is a schematic diagram of an inner wall 210, and FIG. 3C is a top and side view of a static mixer 212.

The static mixer stage 200 includes a vessel 202 having an inlet 204 and an outlet 206. Irrigation water is received at the inlet 204. The vessel 202 is a double walled vessel. An inner wall 210 is included in the vessel 202 to create the double walled structure. A narrow area is formed between the vessel 202 and the inner wall 210 and the interior of the inner wall 210 is a wider area. Irrigation water received at the inlet 204 enters the narrow area between the vessel 202 and the inner wall 210. The irrigation water proceeds at a high velocity through the narrow area. At a bottom of the vessel 202, the irrigation water enters the wider interior area of the inner wall 210 where its velocity slows due to the larger diameter. The irrigation water proceeds upward through interior of the inner wall 210 into the static mixer 212. In some example embodiments, the vessel 202 may include a drain 208 disposed at its lower end.

The static mixer 212 is disposed at the interior of the inner wall 210. The static mixer 212 has a cylindrical shape and is filled with an alloy mesh. The static mixer 212 may also include screens at each end. Alloys are dissimilar metals that will ionize and release dissolved minerals or nutrients. Once the irrigation water passes through the static mixer 212 it proceeds to the outlet 206.

In some example embodiments of the disclosed concept, the vessel 202 is composed of a metallic material such as stainless steel and has a substantially cylindrical shape having a height of about 38 inches and a diameter of about 8 inches. The inner wall 210, in some example embodiments, is composed of PVC. The inner wall 210 has an upper portion with a substantially cylindrical shape having a diameter about the same as the inner diameter of the vessel 202. The inner wall 210 also has a lower portion with a substantially cylindrical shape having a diameter less than the inner diameter of the vessel 202 (e.g., without limitation, about 6.5 inches). The inner wall 210 has a height of about 31 inches. In some example embodiments, the static mixer 212 has a substantially cylindrical shape with a diameter of about 7 inches and a height of about 13 inches. However, it will be appreciated by those having ordinary skill in the art, that the dimensions and materials of the various components of the static mixer stage 200 may be modified without departing from the scope of the disclosed concept.

The static mixer stage 200 may include one or a plurality of vessels 202. For example, referring back to FIG. 1, the static mixer stage 200 includes two vessels 202. It will be appreciated that any number of vessels 202 may be employed in the static mixer stage 200 without departing from the scope of the disclosed concept.

Figure 4B:
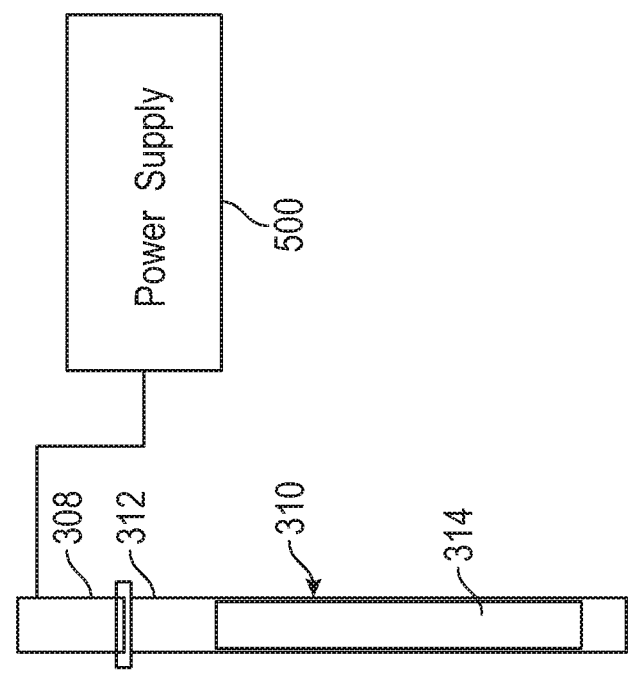
FIG. 4B is a schematic diagram of an electrode assembly in accordance with an example embodiment of the disclosed concept.
Figure 4A:
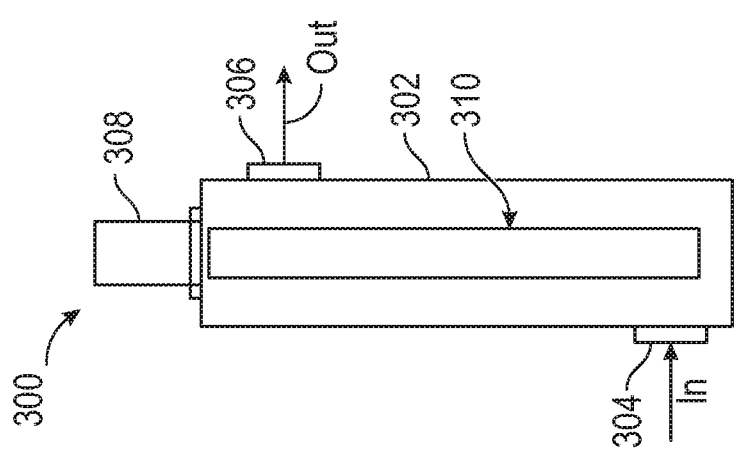
FIG. 4A is a schematic diagram of a high voltage electrode stage in accordance with an example embodiment of the disclosed concept.

Irrigation water from the static mixer stage 200 proceeds to the high voltage electrode stage 300. FIG. 4A is a schematic diagram of the high voltage electrode stage 300 and FIG. 4B is a schematic diagram of an electrode assembly 310.

The high voltage electrode stage 300 includes a vessel 302 having an inlet 304 and an outlet 306. Irrigation water is received at the inlet 304 and proceeds through the vessel 302 to the outlet 306. In some example embodiments, a head unit 308 may be disposed at an upper end of the vessel 302. The electrode assembly 310 is disposed inside the vessel 302. In some example embodiments, the vessel 302 has a substantially cylindrical shape having a diameter of about 4 inches and a height of about 31 inches. However, it will be appreciated that the dimensions of the vessel 302 may be modified without departing from the scope of the disclosed concept.

The electrode assembly 310 includes a secondary vessel 312 and an electrode 314. The electrode 314 is disposed within the secondary vessel 312. In some example embodiments, the secondary vessel 312 has a substantially cylindrical shape with a diameter smaller than the diameter of the vessel 302. For example, the secondary vessel may have a diameter of about 1.72 inches and a height of about 30 inches. However, it will be appreciated that the dimensions of the secondary vessel 312 may be modified without departing from the scope of the disclosed concept. The electrode 314 may be composed of a metallic material such as, for example and without limitation, copper. The electrode 314 may have a substantially cylindrical shape having a diameter less than the inner diameter of the secondary vessel 312. In some example embodiments, the electrode 314 has a height of about 24 inches.

The electrode 314 is connected to and receives power from the power supply 500. In some example embodiments, the power supply 500 provides a voltage in a range of about 10-20 kV DC to the electrode 314. The DC power creates an electrostatic field within the vessel 302. The irrigation water passing through the vessel 302 is subjected to the electrostatic field which disperses mineral and nutrient molecules as well as reduces water surface tension of the irrigation water. Dispersing the mineral and nutrient molecules reduces the size of minerals and nutrients, which makes it easier for plants to absorb the minerals and nutrients. The reduced surface tension of the irrigation water also allows for more efficient plant growth.

The high voltage electrode stage 300 may include one or a plurality of vessels 302. For example, referring to FIG. 1, the high voltage electrode stage 300 includes two vessels 302. However, it will be appreciated that any number of vessels may be employed without departing from the scope of the disclosed concept.

Referring back to FIG. 1, the system 1 may also include a processor 400, a power supply 500, and a skid 600. The processor 400 may be structured to control various aspects of the system such as, without limitation, opening and closing inlets and outlets. The power supply 500 may be used to power various components of the system 1. For example, the power supply 500 may be structured to generate and provide a voltage in the range of 10-20 kV DC to provide to the electrode 314. The skid 600 may be a frame structured to support the remaining components of the system 1. In some example embodiments, the skid 600 has a length of about 48 inches, a width of about 24 inches, and a height of about 48 inches. However, it will be appreciated that the dimensions of the skid 600 may be modified without departing from the scope of the disclosed concept. In some example embodiments, the dimensions of the skid 600 define the extent of the system 1. That is, the system 1 fits within the dimensions of the skid 600.

The system 1 is operable to reduce treat irrigation water to promote plant growth and health. The magnetic electrode stage 100 subjects the irrigation water to the alternative on/off square wave, which reduces clumping of minerals and nutrients. The static mixer stage 200 precipitates suspended solids and ionizes and releases dissolved nutrients and minerals. The high voltage electrode stage 300 disperses minerals and nutrients and reduces the surface tension of the irrigation water. The treated irrigation water emerging from the system 1 has smaller mineral and nutrient particles and lower surface tensions, which allows for better plant absorption and promotes better plant growth and health. The system 1 may be integrated into existing irrigation systems in order to treat the irrigation water before it is dispersed to plants. It will be understood by those having ordinary skill in the art that the disclosed concept may be applied to a variety of irrigation applications including both soil irrigation and hydroponics. It will also be appreciated that the disclosed concept may be applied outside of irrigation applications, such as in other water treatment applications.

The disclosed concept may also be embodied as a method. For example, the method may include receiving water, causing the water to be subjected to a plurality of magnetic fields alternating in polarity, directing the water through an ally mesh, and causing the water to be subjected to an electrostatic field.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method of treating water, the method comprising:
receiving water, wherein the water is irrigation water including one or more mineral or nutrient additives; and
causing the water to be subjected to a first and second electrostatic field to disperse the one or more mineral or nutrient additives and reduce surface tension of the irrigation water, wherein dispersing the one or more mineral or nutrient additives reduces the size of the one or more mineral or nutrient additives,
wherein causing the water to be subjected to the first and second electrostatic field includes passing the water in series through a first electrode vessel and a second electrode vessel, each of the first electrode vessel and the second electrode vessel having an outer vessel through which the water passes and an inner vessel disposed within the outer vessel and including an electrode,
wherein the electrode of the first electrode vessel is powered in a range of 10-20 kV DC to generate the first electrostatic field the water is subjected to and the electrode of the second electrode vessel is powered in the range of 10-20 kV DC to generate the second electrostatic field the water is subjected to.

2. The method of claim 1, further comprising:
causing the water to be subjected to a plurality of magnetic fields alternating in polarity,
wherein causing the water to be subjected to a plurality of magnetic fields includes passing the water through a magnetic electrode stage including an enclosure vessel and a magnetic electrode assembly disposed within the enclosure vessel.

3. The method of claim 2, wherein the magnetic electrode assembly includes a plurality of spacers and a plurality of magnets alternately stacked, and wherein the plurality of magnets are arranged such that a first one of the plurality of magnets has an opposite polarity to a second one of the plurality of magnets adjacent to the first one of the plurality of magnets.

4. The method of claim 3, wherein the enclosure vessel includes an inlet disposed at a lower end of the enclosure vessel and an outlet disposed at an upper end of the enclosure vessel such that the water passing from the inlet to the outlet flows along the magnetic electrode assembly.

5. The method of claim 1, further comprising:
directing the water through an alloy mesh,
wherein directing the water through an alloy mesh includes passing the water through a static mixer stage including a vessel having an inner wall dividing a narrow area and a wide area within the vessel, and wherein the water passing through the static mixer stage first enters the narrow area of the vessel and flows to the wide area of the vessel.

6. The method of claim 5, the alloy mesh is disposed within the wide area of the vessel.

\* \* \* \* \*